United States Patent
Richter et al.

(10) Patent No.: US 9,856,997 B2
(45) Date of Patent: *Jan. 2, 2018

(54) RELEASABLE CONNECTOR FOR SUPPORTING A FLEXIBLE CONDUIT

(71) Applicant: The Metraflex Company, Chicago, IL (US)

(72) Inventors: James R. Richter, Chicago, IL (US); Daniel T. Holbach, Palatine, IL (US)

(73) Assignee: The Metraflex Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/377,365

(22) Filed: Dec. 13, 2016

(65) Prior Publication Data
US 2017/0089493 A1     Mar. 30, 2017

Related U.S. Application Data

(63) Continuation-in-part of application No. 14/496,144, filed on Sep. 25, 2014.

(51) Int. Cl.
*F16L 3/00* (2006.01)
*F16L 3/12* (2006.01)
*F16L 3/133* (2006.01)
*F16L 3/01* (2006.01)
*F16L 51/04* (2006.01)

(52) U.S. Cl.
CPC ............... *F16L 3/1218* (2013.01); *F16L 3/01* (2013.01); *F16L 3/133* (2013.01); *F16L 51/04* (2013.01)

(58) Field of Classification Search
None
See application file for complete search history.

(56) References Cited

U.S. PATENT DOCUMENTS

| | | |
|---|---|---|
| 933,625 A | 9/1909 | Clarkson |
| 1,618,851 A | 2/1927 | Thunberg et al. |
| 1,924,353 A | 8/1933 | Fitzpatrick |
| 2,038,466 A | 4/1936 | Yates |
| 2,158,802 A | 5/1939 | Redlon |
| 2,511,335 A | 6/1950 | Guarnaschelli |
| 2,748,236 A | 5/1956 | Landis et al. |
| 3,199,553 A | 8/1965 | Garrett et al. |
| 3,659,329 A | 5/1972 | Walker |
| 3,694,011 A | 9/1972 | Silverman |
| 3,985,213 A | 10/1976 | Braggins |

(Continued)

OTHER PUBLICATIONS

Patent Cooperation Treaty, PCT International Search Report from corresponding International Application PCT/US2015/051689, dated Dec. 29, 2015.

(Continued)

*Primary Examiner* — Monica Millner
(74) *Attorney, Agent, or Firm* — Greer, Burns & Crain, Ltd.

(57) ABSTRACT

A flexible conduit having a rigid portion, a flexible portion and a releasable connector secured to the rigid portion to support the flexible conduit. The releasable connector includes a male member and a female member. One of the two members are secured together with a biasing element such as a retaining ring, and a detent. Both members may include detents, with each detent on the male member including a retaining ring.

16 Claims, 7 Drawing Sheets

(56) References Cited

U.S. PATENT DOCUMENTS

| | | |
|---|---|---|
| 4,105,177 A | 8/1978 | Smith et al. |
| 4,185,477 A | 1/1980 | van der Lely et al. |
| 4,306,696 A | 12/1981 | Pondman |
| 4,344,729 A | 8/1982 | Orsinger et al. |
| 4,406,148 A | 9/1983 | Knight |
| 4,524,934 A | 6/1985 | Rumble |
| 4,524,935 A | 6/1985 | Rumble |
| 4,687,365 A | 8/1987 | Promersberger |
| 4,932,626 A | 6/1990 | Guillot |
| 4,989,903 A | 2/1991 | McAllister |
| 5,167,437 A | 12/1992 | Merten et al. |
| 5,195,784 A | 3/1993 | Richter |
| 5,303,885 A | 4/1994 | Wade |
| 5,459,476 A | 10/1995 | Hsieh |
| 5,484,219 A | 1/1996 | Drew et al. |
| 5,697,480 A | 12/1997 | Herbermann et al. |
| 5,803,506 A | 9/1998 | Argersinger et al. |
| 5,836,361 A | 11/1998 | Koncsek |
| 6,322,276 B1 | 11/2001 | Liu |
| 6,554,524 B1 | 4/2003 | Smith |
| 6,887,022 B2 | 5/2005 | Choate |
| 7,249,704 B1 | 7/2007 | Smith |
| 7,284,728 B2 | 10/2007 | Connolly |
| 7,748,091 B2 | 7/2010 | Bogh-Sorensen |
| 8,181,305 B2 | 5/2012 | Boos |
| 8,210,580 B2 | 7/2012 | Engel et al. |
| 2004/0018042 A1 | 1/2004 | Smith |
| 2005/0081458 A1 | 4/2005 | McDonald |
| 2009/0194992 A1 | 8/2009 | Bochenek et al. |
| 2009/0224533 A1 | 9/2009 | Richter |
| 2012/0310371 A1 | 12/2012 | Bachus et al. |
| 2013/0192944 A1 | 8/2013 | Zimmerman et al. |
| 2016/0091120 A1* | 3/2016 | Richter .............. F16L 51/04 248/60 |

OTHER PUBLICATIONS

Patent Cooperation Treaty, PCT Written Opinion of the International Searching Authority from corresponding International Application PCT/US2015/051689, dated Dec. 29, 2015.

* cited by examiner

RELEASABLE CONNECTOR FOR SUPPORTING A FLEXIBLE CONDUIT

CROSS-REFERENCES TO RELATED APPLICATIONS

This application is a continuation-in-part of U.S. application Ser. No. 14/496,144 filed on Sep. 25, 2014.

BACKGROUND OF THE INVENTION

The present invention relates to a flexible conduit, and more particularly to a flexible conduit having a releasable connector for supporting the flexible conduit.

In the construction of buildings and other structures, it is known to use conduits that include a flexible portion to accommodate movement of the conduit. The movement can be intentional, for example, based upon thermal changes, or misalignment in a piping system, or unintentional, such as from a natural disaster, like an earthquake. Additionally, the movement can dampen vibration of the conduits and reduce the transmission of noise through the conduit. Such a flexible conduit is disclosed, for example, in U.S. Pat. No. 5,195,784.

In order to support the conduit, the flexible portion of the conduit may be connected to an anchor or anchoring means. For example, U.S. Pat. No. 5,195,784 discloses using one or more rods to support the flexible portion of the conduit by securing one end of the rod thereto and by anchoring the other end of the rod into a ceiling or other structural support member.

While presumably effective for its intended purpose, the anchoring rods are relatively rigid. Accordingly, if forces acting on the flexible conduit are not strong enough to break or bend the rod, the flexible conduit could break instead. This could be dangerous with objects falling, and depending on the fluids in the conduit, could be deadly. Additionally, based upon the length of the flexible members of the flexible conduit, an undesirable and unappealing sagging of the flexible members may occur.

Thus, it would be desirable to provide for a flexible conduit that is supported, but, when the flexible conduit is subjected to certain forces, the support disengages so as to avoid the flexible conduit breaking.

Additionally, it would further be desirable to provide a flexible conduit that can be adjusted so that the amount of force needed to disengage the flexible conduit from the support could be varied based upon particular applications.

Furthermore, it would also be desirable to provide such a flexible conduit with a secondary support to support the flexible conduit if a primary support has been disengaged.

Finally, it would be desirable to have a flexible conduit that is supported but allowed to fully bend and flex as desired.

SUMMARY OF THE INVENTION

A new flexible conduit having a releasable connector to support the flexible conduit has been invented.

According to a first aspect of the present invention, the present invention comprises a flexible conduit with at least one flexible member, at least one rigid member, and, a releasable connector. The releasable connector comprises a female member and a male member. The female member comprises a body with an attachment member at a first end and a cavity with an open end at a second end. The male member comprises a body with a shaft configured to be received in the cavity of the female member. The shaft of the male member comprises a first end having an attachment member. A first member comprises one of the female member and the male member, and the first member comprises at least one biasing element. A second member comprises one of the female member and the male member, the second member different than the first member and comprising at least one detent. Each biasing element is configured to engage a detent to secure the shaft of the male member in the cavity of the female member. One of the attachment members secures the releasable connector to at least one rigid member, at least one flexible member, or both. The first member may comprise the male member and the second member comprises the female member. The at least one biasing element may comprise a retaining ring. The first member may comprise at least one detent. The at least one detent in the of the first member and the at least one detent of the second member may comprise a pair of detents, and the at least one biasing element is arranged to engage both detents from the pair of detents. The at least one biasing element may comprise a retaining ring. The first member may comprise the male member and the second member may comprise the female member. Both the male member and the female member may include a plurality of detents. A retaining ring may be disposed in each detent on the male member.

In a second aspect of the present invention, the invention provides a flexible conduit with at least two rigid members, at least one flexible member disposed between the at least two rigid members, and, a releasable connector. The releasable connector includes a female member and a male member. The female member includes a body with an attachment member at a first end, a cavity having an open end at a second end of the body, and, at least one detent in the cavity. The male member comprises a shaft with a first end having an attachment member and at least one detent disposed on the shaft. A biasing element is disposed on the shaft in the at least one detent. The shaft is configured to be received in the cavity of the female member and the biasing element is configured to engage the at least one detent on the female member when the shaft of the male member is received in the body of the female member. The attachment member on at least one of the male member or the female member is secured to at least one rigid member, at least one flexible member, or both. The male member may include a plurality of detents. Each detent of the male member may include a biasing element. The biasing element may comprise a retaining ring.

A flexible conduit according to the present disclosure is believed to provide sufficient support under most circumstances, but, under certain forces, will be capable of additional movement by the releasable connector disengaging to avoid the flexible conduit breaking. The releasable connector can be reengaged to return the flexible conduit to its supported position.

Additionally, a flexible conduit according to the present disclosure is believed to provide sufficient support under most circumstances while allowing the flexible members to fully bend and flex as intended.

These and other aspects and embodiments of the present invention will be appreciated by those of ordinary skill in the art based upon the following description of the drawings and detailed description of the preferred embodiments.

BRIEF DESCRIPTION OF THE DRAWINGS

The attached figures in the drawings will make it possible to understand how the invention can be produced. In these figures, similar reference numbers denote similar elements.

DETAILED DESCRIPTION OF THE PREFERRED EMBODIMENTS

A new flexible conduit having a releasable connector to support the flexible conduit has been invented. The flexible conduit is supported, but, if the flexible conduit is subjected to certain forces, the support disengages so as to avoid the flexible conduit breaking or to allow maximum movement. Additionally, the flexible conduit that can be adjusted so that the amount of force needed to disengage the flexible conduit from the support is variable based upon particular applications. Finally, a flexible conduit with a secondary support to support the flexible conduit if a primary support has been disengaged.

Accordingly, with reference the attached drawings, one or more embodiments of the present invention will now be described with the understanding that the described embodiments are merely preferred and are not intended to be limiting.

Figure 1:
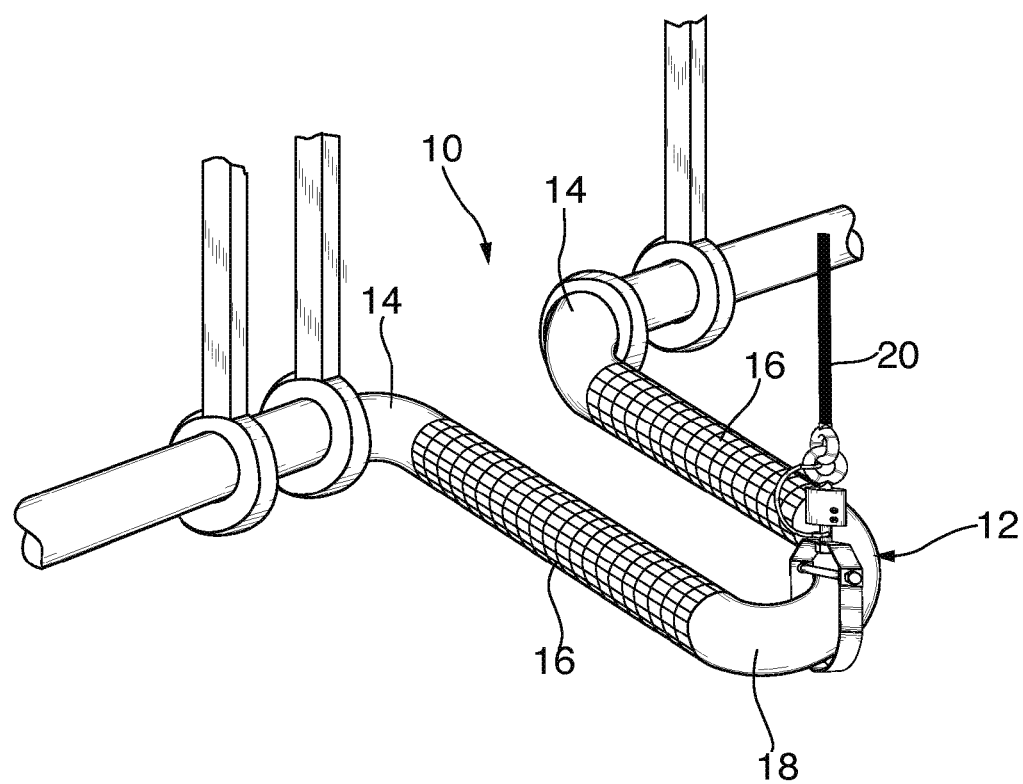
FIG. 1 is a top and side perspective view of a flexible conduit according one or more embodiments to the present invention.

As shown in FIG. 1, a flexible conduit according to the present invention includes, generally, a flexible conduit 10 and a releasable connector 12. The flexible conduit 10 may include for example, two rigid elbow members 14, two flexible tube members 16 (one connected to each rigid elbow member 14), and a rigid U-shaped member 18 disposed between the two flexible tube members 16. Other configurations may be used so long as the flexible conduit 10 includes at least one rigid member 14, 18 and at least one flexible member 16. In some configurations, the elbow members 14 may be formed at a 45 degree angle and the rigid member 18 may have a 90 degree angle (or a V-shape). In still other configurations, the rigid U-shaped member 18 may be replaced by two rigid 90 degree elbow members and an intervening flexible member. Other configurations are possible as well. The stiffness of the members 14, 16, 18 is typically in relation to each other, with the rigid members 14, 18 comprising metal, plastic, or the like, and the flexible members 16 comprising mesh covered conduits such as metal braided hose or another similar material. These materials are merely exemplary.

The releasable connector 12 is utilized to anchor the flexible conduit 10 to a support structure like a wall or ceiling, for example with a rod 20. A preferred releasable connector 12 is shown in FIG. 2 in which the releasable connector 12 includes a female member 22 and a male member 24.

Figure 2:
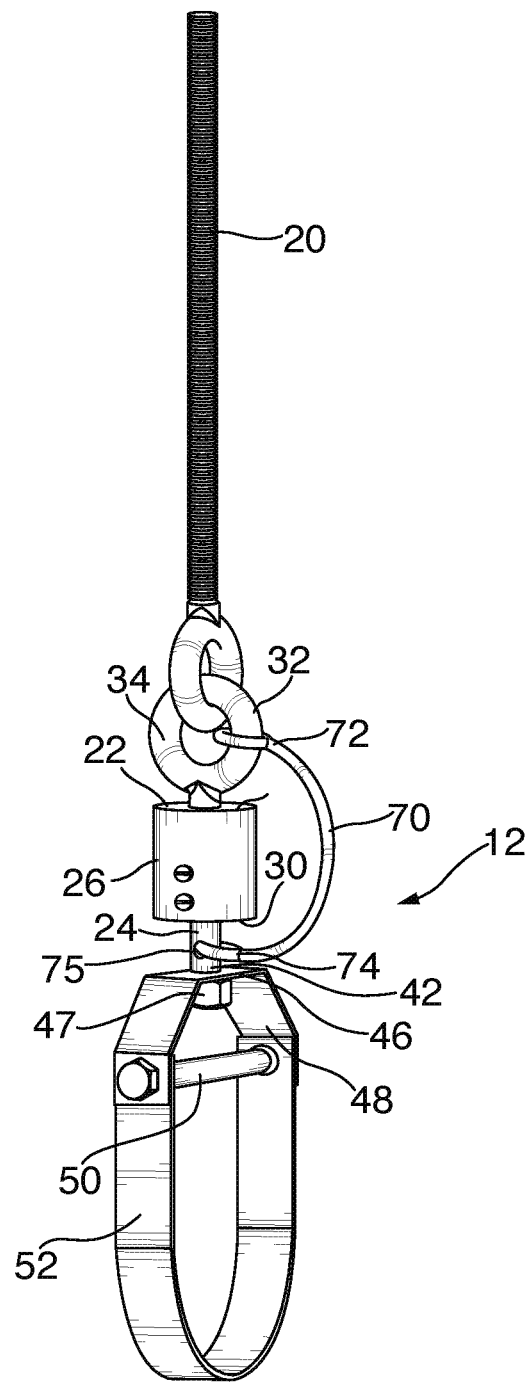
FIG. 2 is side perspective view of a releasable connector of the flexible conduit in FIG. 1.
Figure 3:
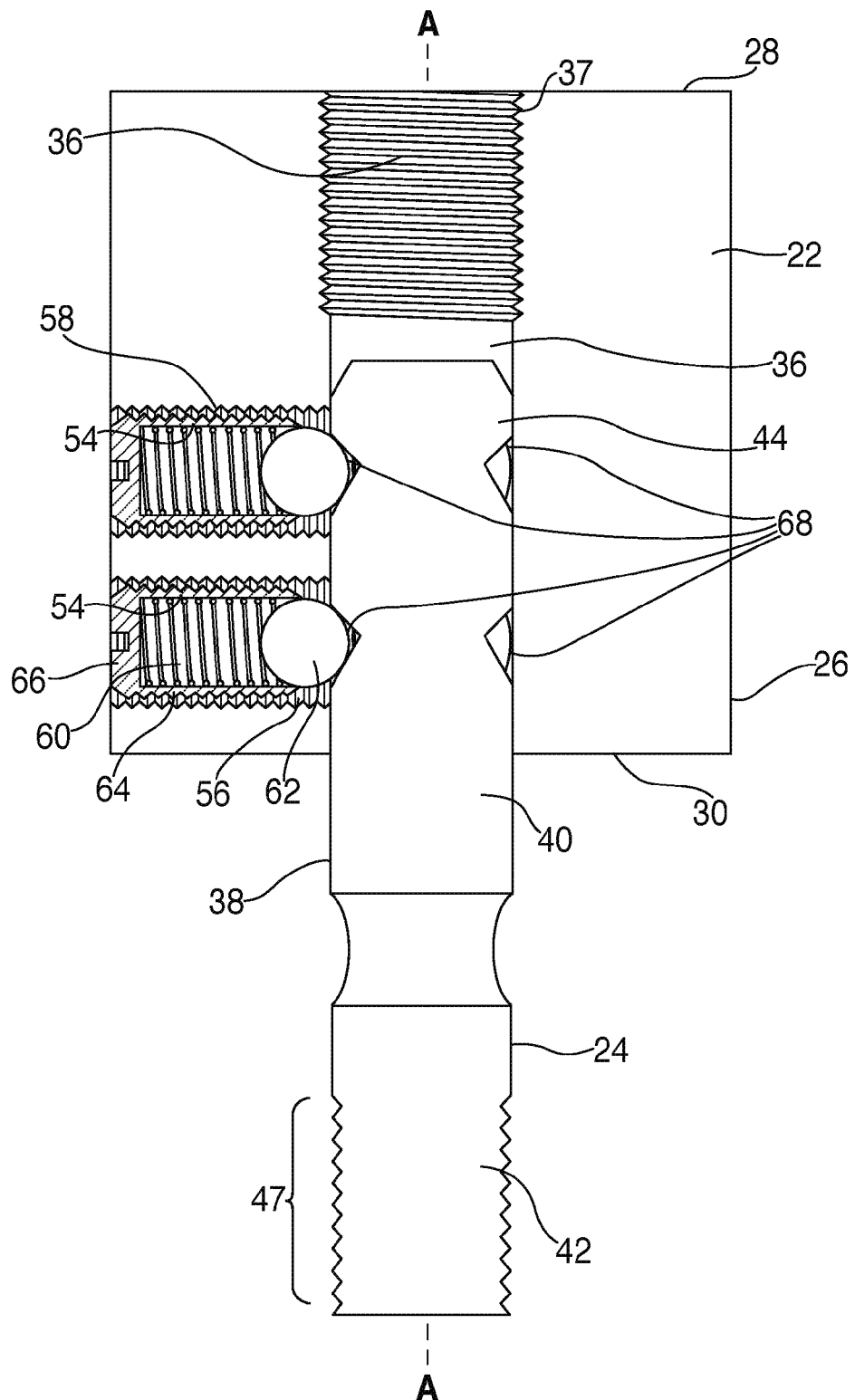
FIG. 3 is a side cutaway view of a portion of the releasable connector of FIG. 2.

With reference to FIGS. 2 and 3, the female member 22 includes a body 26 with a first end 28 and a second end 30. The first end 28 of the female member 22 has an attachment member 32, such as an eye bolt 34, which can be secured to the rod 20 which may be anchored to a wall or ceiling. As can be seen in FIG. 3, the eye bolt 34 includes a threaded shaft 35 which is received in a threaded aperture 37 in the first end 28 of the body 26 of the female member 22. The second end 30 of the female member 22 is open, at least partially, allowing access to a cavity 36 in the body 26 of the female member 22 (discussed below).

The male member 24 includes a body 38 comprising a shaft 40 with a first end 42 and a second end 44. The second end 44 of the male member 24 is configured to be received in the cavity 36 of the female member 22. The first end 42 of the male member 24 includes an attachment member 46 which may be secured to the male member 24 by a nut 47 threaded onto a threaded portion 49 preferably on the second end 44 of the shaft 40. In an embodiment, the attachment member 46 comprises a clevis 48. The clevis 48 includes a pin 50 and a u-bracket 52 (or second u-shaped clevis) to secure about a member 14, 16, 18 of the flexible conduit 10 (see FIG. 1).

Although not depicted as such, it is also contemplated that attachment member 46 on the male member 24 is secured to one of the flexible members 16. Moreover, although it is depicted that the female member 22 is secured to the rod 20 and the male member 24 is secured to at least one member 14, 16, 18 of the flexible conduit 10, it should be appreciated that the configuration could be reversed, with the male member 24 secured to the rod 20 and the female member 22 secured to at least one member 14, 16, 18 of the flexible conduit 10. In some instances, based upon the length of the flexible tube members 16, the releasable connector 12 may be utilized to minimize sag associated with same.

The eye bolt 34 and the clevis 48 are merely exemplary attachment members 32, 46. Other structures may be used, for example, clips, clasps, threaded rods, screws, fasteners, and the like.

In the support arrangement of FIG. 1, in the normal use of the flexible conduit 10, the conduits to the left and right of the rigid elbow members 14 may normally experience axial contraction or expansion causing the two rigid elbow members 14 to move closer to each other or farther apart as the flexible members 16 flex. When this occurs, the U-shaped member 18 will move towards and away from the axis of the long conduits on either side of the rigid elbow members 14. As a result of this normal or intentional movement, the connection to the support rod 20 should allow for some accommodation of the movement in the flexible conduit 10. Other configurations of connections that accommodate this intentional movement of the U-shaped member 18 relative to the support rod 20 can also be preferably utilized.

As shown in FIG. 3, the second end 44 of the male member 24 can be inserted into the cavity 36 of the female member 22. The female member 22 includes a plurality of biased plungers 54, each disposed in an aperture 56, preferable a threaded bore 58. The biased plungers 54 may each include a biasing element 60 and a ball 62. Although not required, the biasing element 60 is disposed inside of a housing 64 that includes an end 66 configured as a set screw. The end 66 can be rotated, moving the biasing plunger 54 inward (or outward) to increase (or decrease) the force required to overcome the biasing element 60. Alternatively, no housing may be provided and merely a set screw can be used to adjust the strength of the biased plunger 54. In either case, allowing the strength of the biased plungers 54 to be adjusted, will provide for a single releasable connector 12 to be tailored to various applications with different strength requirements. For example, the force required to overcome the biased plungers 54 (discussed below) is 1.5 times the weight of the member of the flexible conduit 10 that the releasable connector 12 is secured to.

Figure 4:
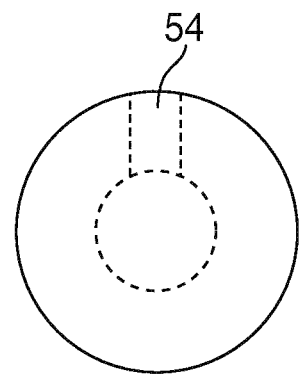
FIG. 4 is a top view of a female member of a flexible conduit according to an embodiment of the present invention.
Figure 5:
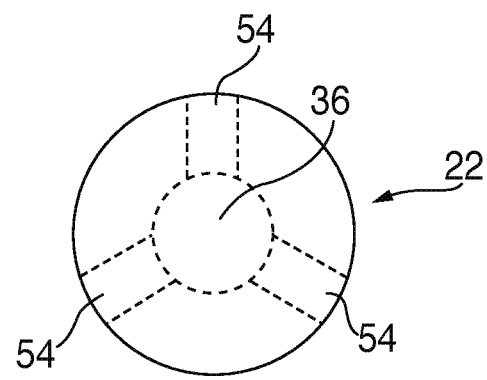
FIG. 5 is a top view of another female member of a flexible conduit according to an embodiment of the present invention.

Additionally, it is contemplated that any number of biased plungers 54 can be used, with two or more biased plungers 54 being preferred. As shown in FIG. 3, the biased plungers 54 may be disposed at different vertical positions along an axis running longitudinally along the body 26 of the female member 22 from the first end 28 to the second end 30. As shown in FIG. 4, when viewed from the top of the female member 22, the biased plungers 54 may be in axial alignment. Alternatively, as shown in FIG. 5, when viewed from the top of the female member 22, the biased plungers 54 can be disposed angularly about the longitudinal axis (running into and out of the paper) of the female member 22. Preferably, the biased plungers 54 are equidistantly disposed angularly about the longitudinal axis of the female member 22.

Returning to FIG. 3, in order to be secured to the female member 22, the male member 24 includes a plurality of detents 68 along the shaft 40 of the male member 24. The detents 68 are positioned such that when the shaft 40 of the male member 24 is in the cavity 36 of the female member 22, a first biased plunger 54 engages a first detent 68 and a second biased plunger 54 engages a second detent 68. Although not required, it is preferred that each biased plunger 54 engage a detent 68.

In use, if the force pulling the two members 22, 24 apart overcomes the forces of the biasing element 60 of the biased plunger 54, the male member 24 and the female member 22 will disengage because, as is known, ramped surfaces of the detent 68 will force the biased plunger 54 inward, as the male member 24 and female member 22 are pulled apart. Eventually, the ball 62 of the biased plunger 54 will be completely removed from the detent 68, allowing the male member 24 to be removed from the female member 22.

As shown in FIG. 2, in order to avoid the flexible conduit 10 from breaking and falling, a secondary support line 70 (such as a rope or cable) may be used. The secondary support line 70 includes a first end 72 and a second end 74. The first end 72 may be secured to the attachment member 32 of the female member 22 and the second end 74 of the secondary support line 70 may be secured to the attachment member 46 of the male member 24 such as through opening 75 in the shaft 40 of the male member 24. Once the male member 24 and the female member 22 of the releasable connector 12 (i.e., the primary support member) are disengaged, the secondary support member 70 will support the flexible conduit 10, until the primary support member (i.e., the releasable connector 12) can be reengaged. The length of the secondary support member 70 is sufficiently long to allow for disengagement of the male member 22 from the female member 22, but not so long as to allow deformation or breakage of the flexible conduit 10 when the male member 24 and the female member 22 are disengaged.

Figure 6:
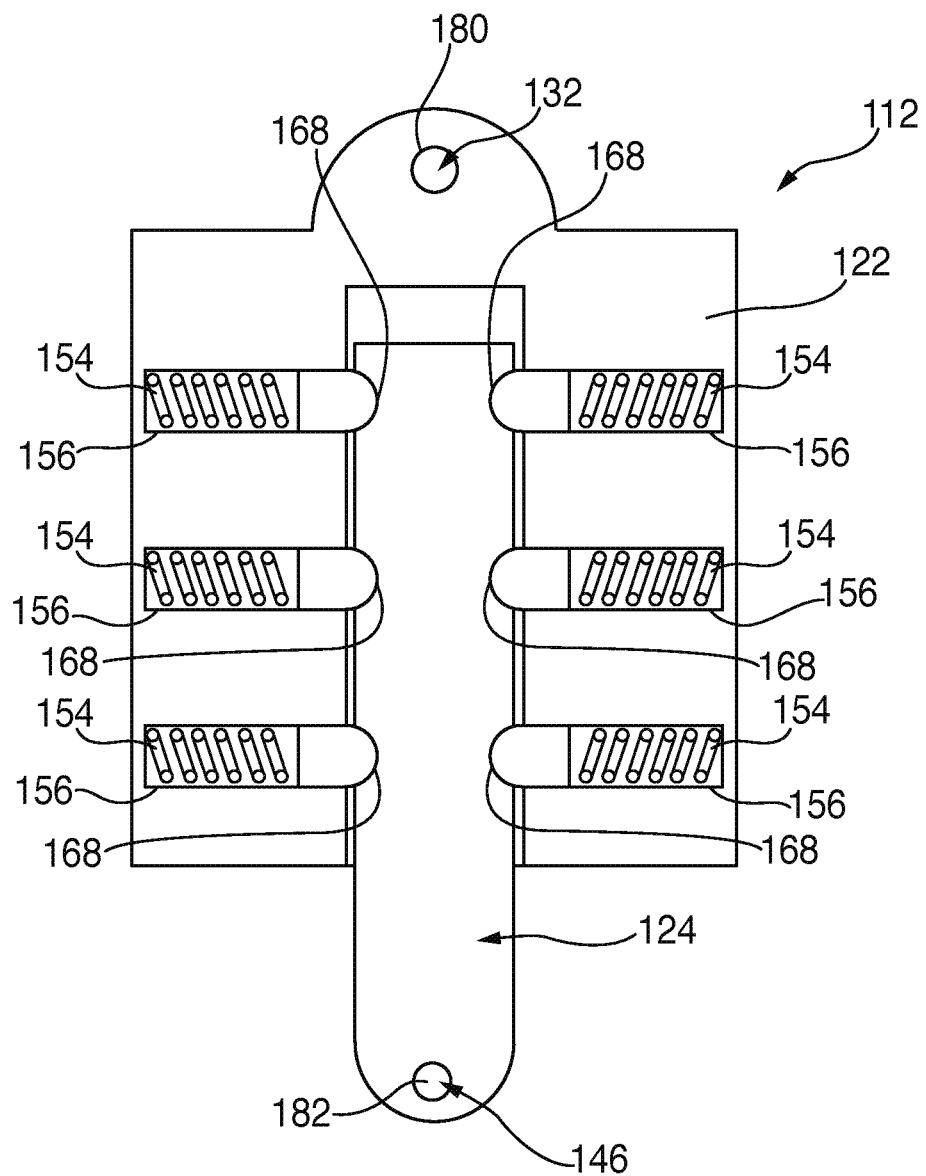
FIG. 6 is a side cutaway view of a releasable connector of according to an embodiment of the present invention.

As shown in FIG. 6, a releasable connection 112 is shown in which a female member 122 includes six apertures 156 each capable of receiving a biased plunger 154. The apertures 156 are in sets of two, with the apertures 156 in each set sharing a longitudinal axis. As will be appreciated, in such a configuration, one detent 168 will engage the two biased plungers 154 of the set.

Although the female member 122 is shown with six biased plungers 154, less than six could be used. This provides the ability to provide for one releasable connector 112 capable of multiple configurations with different strengths. It should be appreciated, that six biased plungers 154 are merely exemplary and that any number can be used. It is preferred, although not required, that the number of biased plungers 154 is even, and that the biased plungers 154 are equally spaced within the female member 122. Additionally, in the depicted embodiment, the male member 124 has three detents 168. As will be appreciated, depending on the number and/or the configuration of the biased plungers 154, one or more detents 168 may not engage a biased plunger 154 when the male member 124 is secured to the female member 122.

In this embodiment, the attachment member 132 on the female member 122 and the attachment member 146 on the male member 124 both comprise apertures 180, 182, respectively. As will be appreciated and although not shown, the apertures 180, 182 may receive another attachment member such as a hook, clip, cord, rope, tie, clevis, or the similar member to secure to at least one member (flexible or rigid) of the flexible conduit 10 or the support rod 20, as the case may be. Other configurations may also be used, including the clevis 48 and the eyebolt 34 shown in the configuration of FIGS. 2 and 3.

Figure 7:
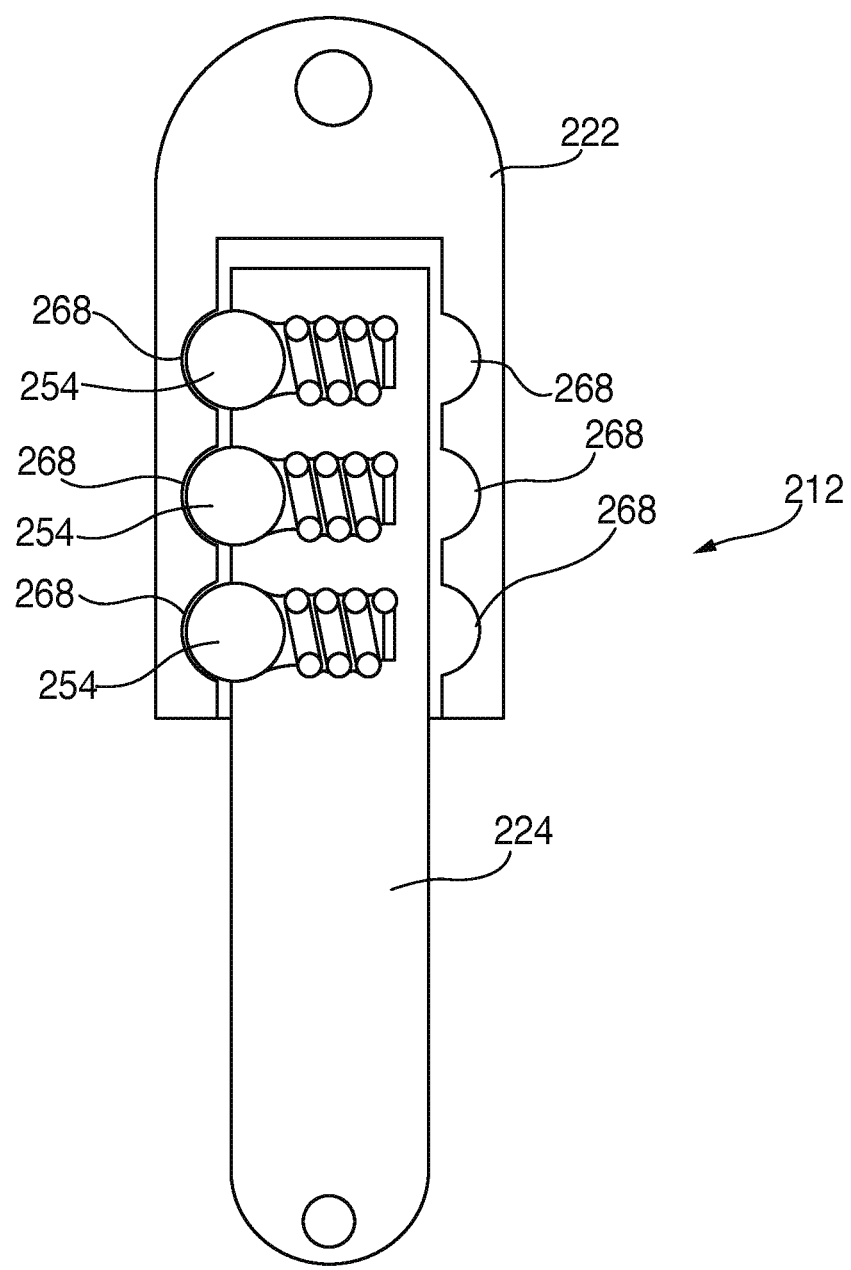
FIG. 7 is a side cutaway view of a releasable connector of according to an embodiment of the present invention.

In FIG. 7, an embodiment of the present invention is shown in which the releasable connector 212 comprises a male member 224 which includes a plurality of biased plungers 254. Accordingly, the female member 222 includes a plurality of detents 168. The remaining portions of this embodiment are similar to those previously discussed.

Figures 8, 9:
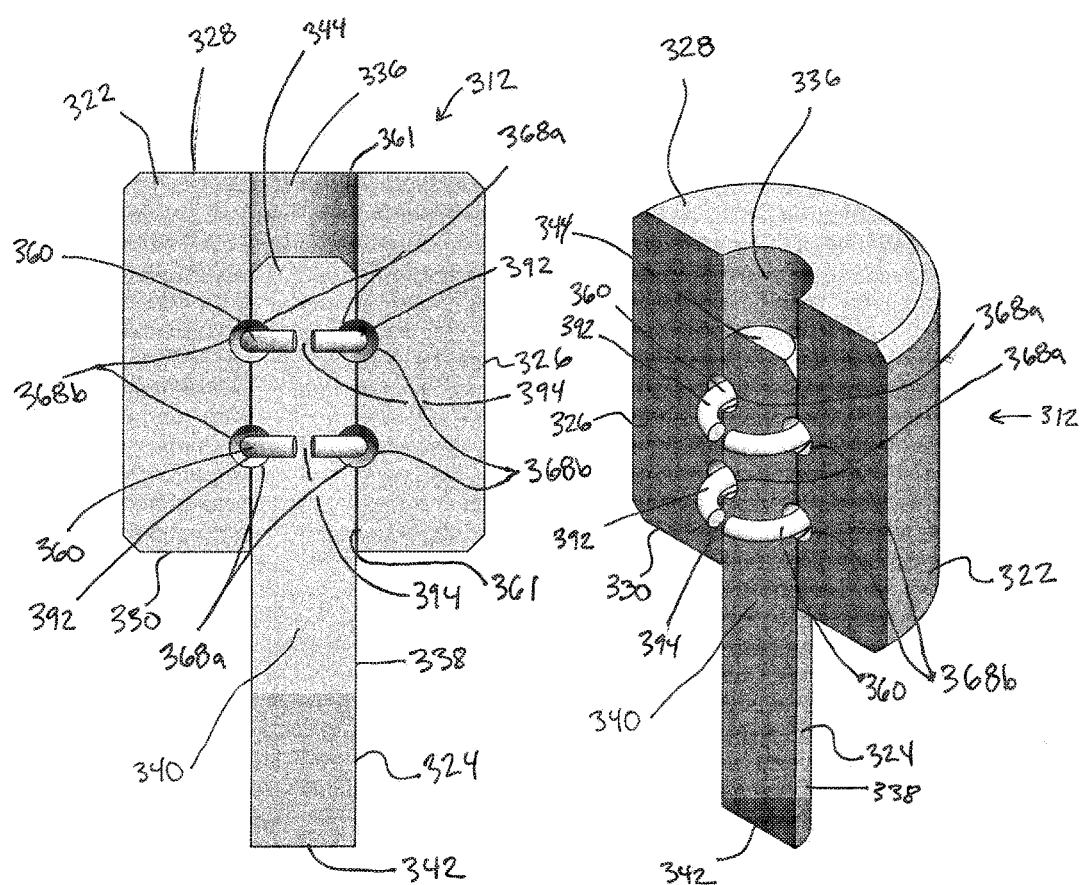
FIG. 8 is a side cutaway view of a releasable connector of according to an embodiment of the present invention.
FIG. 9 is a top and side perspective cutaway view of the releasable connector shown in FIG. 8.

Turning to FIGS. 8 and 9, another releasable connector is shown and generally designated 312 which could be used in association with the flexible conduit 10. The releasable connector 312 includes a female member 322 and a male member 324.

The female member 322 comprises a body 326 with a cavity 336, a first end 328, and a second end 330. Although not depicted as such, the first end 328 of the female member 322 is associated with an attachment member. Exemplary attachment members include the eye bolt 34 shown in FIGS. 2 and 3, or the aperture 180 in FIG. 6. The second end 330 of the body 326 is open allowing access to the cavity 336.

The male member 324 comprises a body 338, which preferably comprises a shaft 340 with a first end 342 and a second end 344. The second end 344 of the male member 324 is configured to be received in the cavity 336 of the female member 322. The first end 342 of the male member 324 includes an attachment member (not shown) which is used to attach the releasable connector 312 to a member of the flexible conduit 10, such as members 14, 16, 18 discussed above (see, e.g., FIG. 1). Exemplary attachment members are described above with respect to other embodiments, including for example, the clevis 48.

Both the shaft 340 of the male member 324 and the cavity 336 of the female member 322 includes one more detents 368a, 368b. A detent 368a from the shaft 340 and a detent 368b from the cavity 336 form a pair of detents 368a, 368b.

At least one biasing element 360 is disposed about the shaft in the detent 368a. Preferably, the releasable connector includes a biasing element 360 for each pair of detents 368a, 368b. Other configurations are contemplated.

An exemplary biasing element 360 comprises a retaining ring 392 disposed about the shaft 340. The retaining ring 392 is generally circular but includes a gap 394 which permits the retaining ring 392 to reduce its diameter when subjected to a force. The retaining ring 392 may be a "split ring" or a "split retaining ring."

For example, if the male member 324 and the female member 322 are connected together and subjected to forces pulling the two members 322, 324 apart, the detent 368b in the cavity 336 will force the retaining ring 392 to reduce its diameter. With a reduced diameter of the retaining ring 392, the shaft 340 can be removed from the cavity 336. Once the retaining ring 392 is cleared of the cavity 366, the diameter will expand and return to its previous size. Alternatively, the retaining ring 392 may be forced to expand by, for example, the detent 368a on the shaft 340. As the diameter of the retaining ring 392 increases, the shaft 360 can be removed from the cavity 336. As the shaft 340 clears the retaining ring 392 in the cavity 336, the diameter of the retaining ring 392 may contract and return to its original size.

In order to connect the male member 324 and the female member 322, the first end 342 of the shaft 340 is inserted into the cavity 336. The surface 361 of the cavity 336 will compress or enlarge the retaining ring 392 and reduce or enlarge the diameter of same. The shaft 340 with the retaining ring 392 can be inserted into the cavity 336.

Once the detent 368a on the shaft 340 reaches the detent 368b in the cavity 336, the diameter of the retaining ring 392 will expand or contract. With the expanded or contracted diameter, the retaining ring 392 can prevent the shaft 340 from being withdrawn from the cavity 336 until the members 322, 324 are subjected to a force that is great enough to overcome the resiliency of the retaining ring 392.

Any number of materials may be used for the retaining ring 392 so long as the materials allow the retaining ring 392 to be compressed and expanded. For example, metals and various rubbers or other polymers may be used. If multiple retaining rings 392 are used, the material, the size, or both may be variety to provide retaining rings 392 which can withstand different sizes of forces.

The remaining portions of the embodiment shown in FIGS. 8 and 9 may be the same as those previously discussed.

By using the releasable connector 12, 112, 212, 312 the flexible conduit 10 will be supported, until a force is applied to disengage the male member 24, 124, 224, 324 and the female member 22, 122, 222, 322. This will minimize the chance that the flexible conduit 10 will break under excess forces or stress. Additionally, if the flexible conduit 10 includes the secondary support 70, even after the male member 24, 124, 224, 324 and the female member 22, 122, 222, 322 are disengaged, the flexible conduit 10 should remain relatively supported and less likely to injure a person, or completely fall and potentially break the flexible members 16 of the flexible conduit 10 apart. Additionally, as opposed to a rigid support, the use of the releasable connector 12, 112, 212, 312 accommodates full range of flexibility of the flexible members 16.

As mentioned above, it is preferred that the force required to disengage the male member 24, 124, 224, 324 and the female member 22, 122, 222, 322 is preferably 1.5 times the weight of the flexible conduit 10. Other forces can be used. In general, the range will be between a lower limit of the weight of the flexible conduit 10 (or the supported member) and an upper limit that would break or destroy the flexible members 16. This upper limit can depend on a multiple variables including the materials of the flexible members 16 as well as the size and shape of the flexible members 16. For example, if it is desired that the releasable connector 12, 112, 212, 312 disengage with very little force, the force required to disengaged can be 1% of the weight of the flexible conduit 10 or of the supported member(s) 14, 16, 18 of the flexible conduit 10. Again, the exact force desired will depend on a variety of variables.

Finally, in one aspect of the present invention, a flexible conduit, such as flexible conduit 10 in FIG. 1, is supported. The flexible conduit is supported by securing a releasable connector thereto. The releasable connector is also secured to a structural support, such as a ceiling, overhead floor joist, or a wall. The releasable connector is configured to separate into a least two portions upon application of a predetermined force. The two portions will separate at a predetermined point of disengagement. Unlike a rope, cable, rod of other similar member, releasable connectors are designed such that when the releasable connector separates, it is known beforehand approximately where the separation will occur. For a rope, cable, rod of other similar member, those may separate at any point, and most likely the weakest point along the length, which will not be known. It is preferred, although not required that the releasable connector is one that can be re-secured together once the releasable connector has separated. It is most preferred that the releasable connector comprises the releasable connector 12, 112, 212 depicted in the Figures herein. However, other releasable connectors such as breakaway bolts (i.e., bolts with a predetermined breakaway force at a particular point of disengagement) or other types of similar releasable or breakaway connectors may be used.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A flexible conduit including a releasable connector, the flexible conduit comprising:
    at least one flexible member;
    at least one rigid member; and,
    the releasable connector comprising: a female member comprising a body with a first attachment member at a first end and a cavity with an open end at a second end; and, a male member comprising a shaft configured to be received in the cavity of the female member, the shaft of the male member comprising an end having a second attachment member;
    wherein a first member comprises one of the female member and the male member, and the first member further comprising at least one biasing element,
    wherein a second member comprises the other of the female member and the male member, and the second member further comprising at least one detent, the at least one biasing element configured to engage the at least one detent to secure the shaft of the male member in the cavity of the female member, and,
    wherein one of the first and second attachment members secures the releasable connector to the at least one rigid member, the at least one flexible member, or both and,
    wherein the first member and the second member are configured such that when connected to each other, the first member and the second member separate once a force pulling the first member and the second member apart is greater than a force required to overcome the at least one biasing element.

2. The flexible conduit of claim 1, wherein the first member comprises the male member and the second member comprises the female member.

3. The flexible conduit of claim 2, wherein the at least one biasing element comprises a retaining ring.

4. The flexible conduit of claim 1, wherein the first member comprises a detent.

5. The flexible conduit of claim 4, wherein the at least one biasing element engages the detent of the first member and the at least one detent in the second member.

6. The flexible conduit of claim 5, wherein the at least one biasing element comprises a retaining ring.

7. The flexible conduit of claim 6, wherein the first member comprises the male member and the second member comprises the female member.

8. The flexible conduit of claim 7, wherein the male member and the female member both include a plurality of detents.

9. The flexible conduit of claim 8 wherein a retaining ring is disposed in each detent from the plurality of detents on the male member.

10. A flexible conduit including a releasable connector, the flexible conduit comprising:
    at least two rigid members;
    at least one flexible member disposed between the at least two rigid members; and,
    the releasable connector comprising:
    a female member having a body with a first attachment member at a first end, a cavity having an open end at a second end of the body, and, at least one cavity detent in the cavity; and,
    a male member comprising a shaft with an end having a second attachment member and at least one shaft detent disposed on the shaft, and wherein a biasing element is disposed on the shaft in the at least one shaft detent, wherein the shaft is configured to be received in the cavity of the female member and the biasing element is configured to engage the at least one cavity detent on the female member when the shaft of the male member is received in the body of the female member, and,
    wherein at least one of the first attachment member and the second attachment member is secured to at least one of the at least two rigid members, the at least one flexible member, or both.

11. The flexible conduit of claim 10, wherein the male member has a plurality of shafts detents.

12. The flexible conduit of claim 11, further comprising a plurality of biasing elements, wherein each detent from the plurality of shaft detents of the male member includes a biasing element from the plurality of biasing elements.

13. The flexible conduit of claim 10, wherein the biasing element comprises a retaining ring.

14. The flexible conduit of claim 13 wherein the retaining ring is configured to expand to permit withdrawal of the male member from the female member.

15. The flexible conduit of claim 13 wherein the retaining ring is configured to contract to permit withdrawal of the male member from the female member.

16. A flexible conduit including a connector, the flexible conduit comprising:
    at least one rigid member;
    at least one flexible member secured to the at least one rigid member; and,
    the connector having a first end and a second end, the first end secured to the at least one rigid member, the at least one flexible member, or both, and the second end configured to be secured to a structural support member,
    wherein the connector is configured to separate into at least two different portions once a force pulling the first end and the second end of the connector apart that is greater than a predetermined force is applied to the connector, wherein the predetermined force is at least 1.5 times a weight of the at least one flexible member,
    and wherein the at least two different portions of the connector are configured to be re-connected after the connectors has separated.

* * * * *